United States Patent [19]
Asao

[11] Patent Number: 6,023,112
[45] Date of Patent: *Feb. 8, 2000

[54] ALTERNATING CURRENT GENERATOR WITH IMPROVED FAN SYSTEM

[75] Inventor: Yoshihito Asao, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/650,308

[22] Filed: May 20, 1996

[30] Foreign Application Priority Data

Nov. 6, 1995 [JP] Japan ................................. 7-287289

[51] Int. Cl.[7] ............................... H02K 9/00; H02K 9/04
[52] U.S. Cl. .............................. 310/58; 310/62; 310/63; 310/263
[58] Field of Search ........................... 310/58, 62, 63, 310/263

[56] References Cited

U.S. PATENT DOCUMENTS

| | | | |
|---|---|---|---|
| 1,784,102 | 12/1930 | Lincoln et al. | 310/58 |
| 2,464,221 | 3/1949 | Elks | 310/62 |
| 4,464,594 | 8/1984 | Matsumoto et al. | 310/63 |
| 4,488,070 | 12/1984 | Iwaki et al. | 310/62 |
| 5,241,230 | 8/1993 | Tanak et al. | 310/62 |
| 5,561,334 | 10/1996 | Ishida et al. | 310/62 |
| 5,693,992 | 12/1997 | Kurusu et al. | 310/63 |
| 5,742,107 | 4/1998 | Asao et al. | 310/62 |

FOREIGN PATENT DOCUMENTS

| | | | |
|---|---|---|---|
| 213981 | 3/1987 | European Pat. Off. | 310/62 |
| 59-194651 | 11/1984 | Japan | 310/263 |
| 32547 | 2/1985 | Japan | 310/63 |
| 60-32547 | 2/1985 | Japan | 310/63 |
| 615571 | 6/1978 | U.S.S.R. | 310/63 |

*Primary Examiner*—Nestor Ramirez
*Assistant Examiner*—K. Tamai
*Attorney, Agent, or Firm*—Sughrue, Mion, Zinn, Macpeak & Seas, PLLC

[57] ABSTRACT

In an alternating current generator and fans thereof in accordance with the invention, the cooling efficiency of the alternating current is improved by fans fixed to a rotor. When the fans are formed during a press working operation, the blades are formed directly from the fans by cut-raising the fans toward a bracket side to form blades and simultaneously cut-raising protruding portions toward a rotor side to form protrusions. This design allows for both improvement in cooling efficiency of the alternating current generator and ease of manufacture of the fans.

3 Claims, 10 Drawing Sheets

ALTERNATING CURRENT GENERATOR WITH IMPROVED FAN SYSTEM

BACKGROUND OF THE INVENTION

1. Field of the Invention

The present invention relates to an alternating current generator with an improved fan system, and more particularly, to an alternating current generator in which a rotor is provided with fans for producing cooling air.

The instant application claims priority from Japanese Patent Application No. HEI 7-287289, filed Nov. 6, 1995, which is incorporated herein by reference for all purposes.

2. Description of Related Art

U.S. Pat. No. 4,492,885 discloses a conventional alternating current generator in which a rotor is provided with fans to produce cooling air for cooling the alternating current generator itself.

One of the conventional alternating current generators is hereinafter discussed.

FIG. 15 is a sectional view showing the conventional alternating current generator for a car. FIG. 16 is a perspective view showing a rotor of the generator. FIG. 17 is a partial perspective view showing a fan (ventilating portion) 14 which is attached to the rotor.

As shown, the alternator includes a rotor 1, a rotary shaft 11 driven by a driving force transmitted from an internal combustion engine of a car (not shown) by way of a belt (not shown), a pair of Rondel-type field cores 12, and a field winding 13. The alternator further includes a stator 2 having a stator core 21 and a stator winding 22 which faces the rotor 1 at a predetermined distance therefrom. A front bracket 3 and a rear bracket 4, rotatably support the rotor 1 through bearings 31, 41 and securely hold the stator 2 therebetween. Fans 14, 15 are fixed to the Rondel-type field core 12. Blades 14a, 15a are formed by cut-raising the fans 14, 15.

The Rondel-type field cores 12 are formed into a Rondelshape as shown in FIG. 15 by the steps of forming a low carbon steel or the like into a star shape by forging, etc. and bend-raising a nail portion 12b projecting from a core portion 12a.

With regard to the operation of the conventional alternating current generator of the above-construction, when the rotor 1 is rotated by an external driving force, a magnetic field generated by the field winding 13 surrounds the Rondel-type field cores 12, and the magnetic field passes through the stator winding 22 in conformity with the rotation of the rotor 1, whereby a current is generated on the stator winding 22 and power is generated through a rectifier 5.

Furthermore, when the rotor 1 is rotated, the fans 14 and 15 fixed to the side of the Rondel-type field cores 12 are also rotated, and the blades 14a, 15a revolve, whereby air flow takes place inside the generator. The air flows may be principally divided into: (1) flows (a) and (b) flowing in through an inlet port 3a of the front bracket, passing through the coil end of the stator winding 22, and flowing out through an outlet port 3b of the front bracket, and (2) flows (c) and (d) flowing in through an inlet port 4a of the rear bracket, passing through the rectifier 5 and brush 6, and flowing out through an outlet port 4b of the rear bracket. The inside of the generator is cooled by the air flows.

In the conventional battery charging alternating current generator of the above-mentioned construction and operation, a problem exists in that the space inside the battery charging alternating current generator is limited, making it impossible to enlarge the area of the blades 14a, 15a of the fans 14, 15 and thus improve cooling efficiency, thus resulting in a temperature rise occurring inside the generator. In particular, the surroundings of the stator 2 which generate heat during the power generation, are not sufficiently cooled.

Japanese Laid-Open Patent Publication (unexamined) No.194-651/1984 discloses an alternating current generator in which a fan is bent to be closely and securely fixed to a core. A problem, however, exists in that since the entire fan is bent along the core, a rather complicated shape and assembly process are required. Moreover, the shape of the blades may be disadvantageously deformed.

SUMMARY OF THE INVENTION

The object of the present invention is to solve the above-discussed problems by providing an alternating current generator having improved cooling efficiency, whose method of manufacture is easier.

Another object of the invention is to provide fans for use in an alternating current generator which are easy to manufacture, can be easily mounted on the alternating current generator, and are capable of improving the cooling efficiency of the alternating current generator.

An alternating current generator in accordance with the invention comprises: (1) a rotor having a rotary shaft and a field winding, which is rotated by transmission of a driving force; (2) a bracket for holding the rotor rotatably; (3) a stator fixed to the bracket, having a stationary core and a stationary winding; (4) fans fixed to the rotor; (5) blades formed directly from the fans in the direction toward the bracket; and (6) protruding portions formed directly from the blades in the direction toward the rotor. Consequently, the fans, blades thereof, and protruding portions may be formed easily by press working, and cooling efficiency may be improved.

It is preferable that the blades and projecting portions of the alternating current generator are formed by cut-raising and that the protruding portions are formed into a shape in line with the shape of the rotor. Consequently, a gap between the rotor and each protruding portion may be reduced and the area of the protruding portions may be enlarged as much, resulting in improvement of cooling efficiency.

It is also preferable that the blades be formed by cut-raising the fans toward the bracket side, with each blade being provided with a plate fixed to an end of that blade and a projecting part being mounted on the end of each blade for the positioning of the plate. Consequently, the plates may be easily mounted, and the cooling efficiency may be improved as a result of rectification effect and increase in area by the projecting parts.

It is also preferable that the blades be formed by cut-raising the fans toward the bracket and each blade is provided with a plate portion formed by bending an end portion of the blade. Consequently, the plate portions may be formed simultaneously at the time of press working of the fans, resulting in easy manufacturing.

Another embodiment of an alternating current generator in accordance with the invention comprises: (1) a rotor having a rotary shaft and a field winding, which is rotated by transmission of a driving force; (2) a bracket for holding the rotor rotatably; (3) a stator fixed to the bracket, having a stationary core and a stationary winding; (4) fans fixed to the rotor; (5) blades formed rotatably on the fans; and (6) protruding portions formed on the blades into a shape that is in line with the rotor. Consequently, a sufficient air flow rate is obtained during revolution at a low speed and a reduction of noise is achieved during revolution at a high speed as a result of forming the rotatable fans. Furthermore, cooling performance may be improved as a result of forming the protruding portions.

It is also preferable that in the alternating current generator in accordance with the invention the blades directed toward the bracket are formed by cut-raising, and that the protruding portions are formed in the opposite direction of the bracket by simultaneously cut-raising them when cut-raising the blades directed to the bracket. Consequently, the inventive fans of improved cooling efficiency may be easily manufactured by a press working operation.

The other objects and features of this invention will be understood from the following description with reference to the accompanying drawings.

BRIEF DESCRIPTION OF THE DRAWINGS

In all figures, substantially same elements are given the same reference numbers.

DETAILED DESCRIPTION OF THE PREFERRED EMBODIMENT

Figure 1:
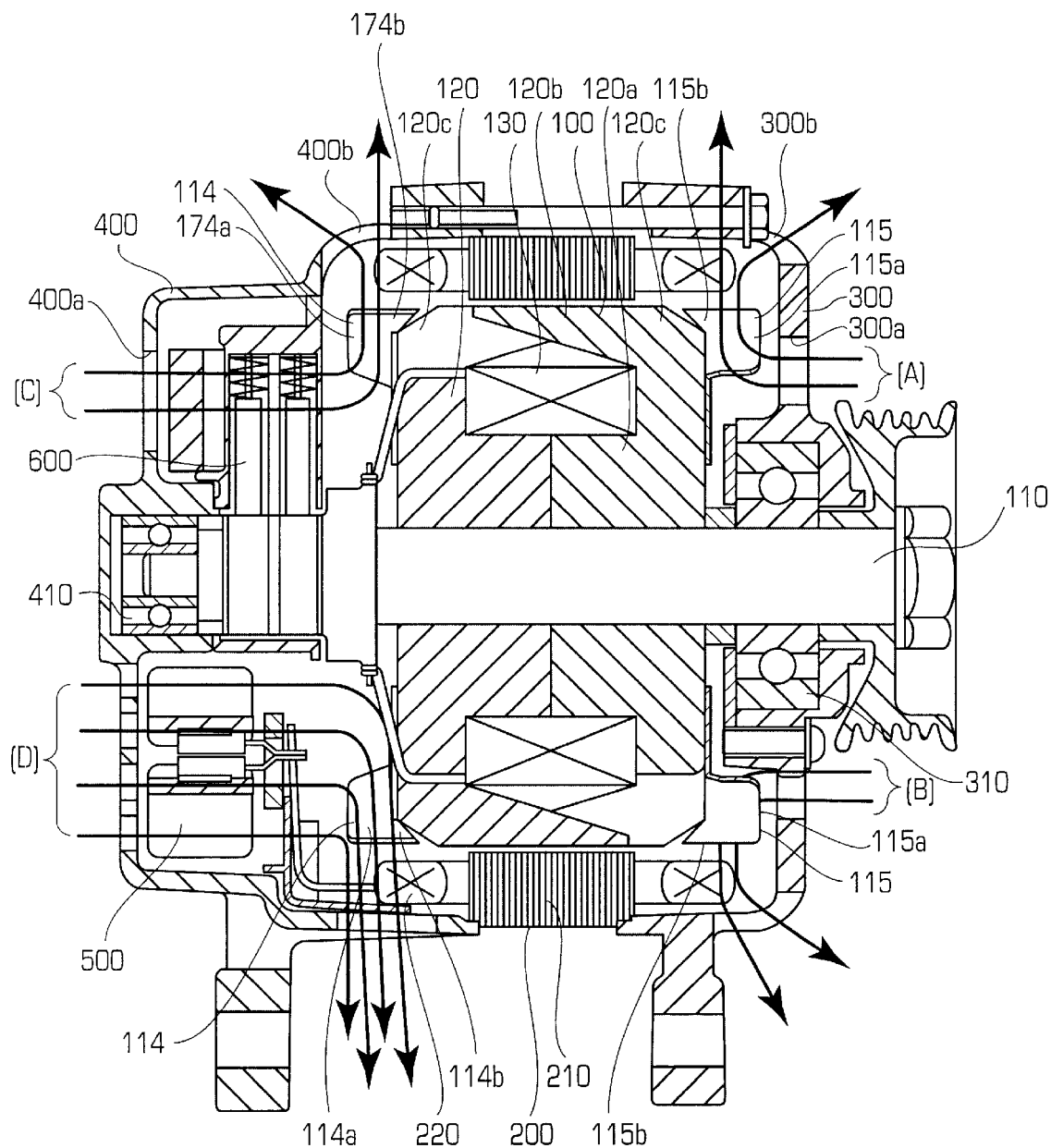
FIG. 1 is a sectional view showing a alternating current generator for a car in accordance with an embodiment of the present invention.
Figure 2:
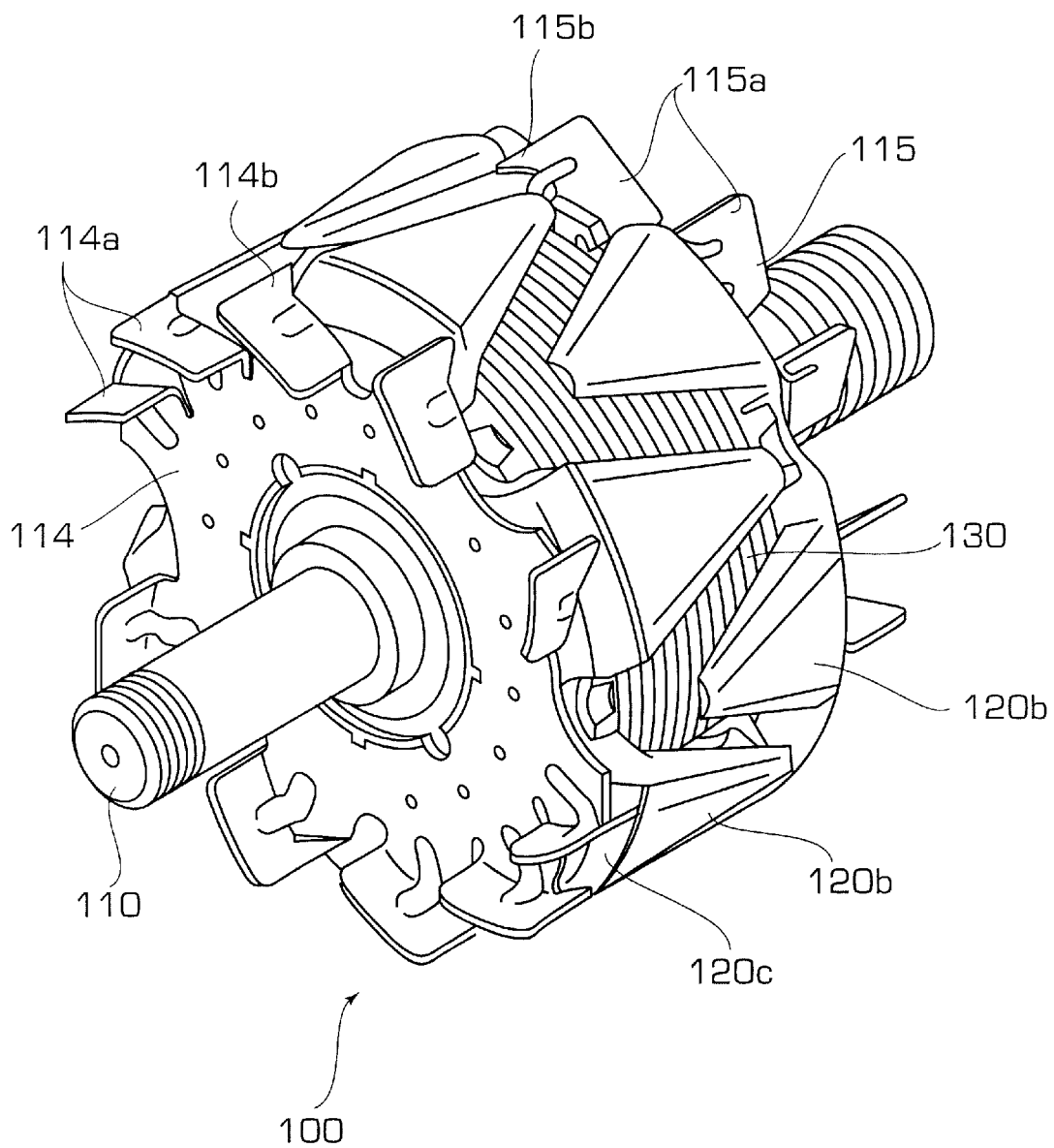
FIG. 2 is a perspective view showing a rotor in accordance with the embodiment shown in FIG. 1.
Figure 3:
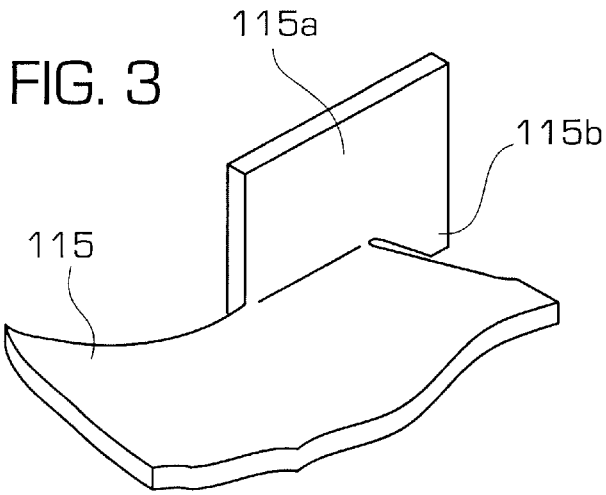
FIG. 3 is a partial perspective view showing a fan in accordance with the embodiment shown in FIG. 1.

FIG. 1 is a sectional view of an embodiment of an alternating current generator for a car in accordance with the present invention. FIG. 2 is a perspective view of a rotor and, FIG. 3 is a partial perspective view of a fan of the embodiment shown in FIG. 1.

The alternating current generator shown in FIG. 1 includes a rotor 100 including a rotary shaft 110 driven by a driving force transmitted from an internal combustion engine of a car (not shown) through a belt (not shown), a pair of Rondel-type field cores 120, and a field winding 130.

A stator 200 having a stator core 210 and a stator winding 220, which face the rotor 100, are spaced at a gap from the rotor 100.

A front bracket 300 and rear bracket 400 rotatably support the rotor 100 through bearings 310, 410 and securely hold the stator 200 therebetween.

The Rondel-type field cores 120 are formed into a Rondel-type shape as shown in FIG. 2 by bend-raising nail portions 120b projecting from a core portion 120a, after forming a low carbon steel or the like into a star shape by forging. In such a forming step, since the nail portions 120b are raised by bending, an R portion (i.e., curved portion) is formed. It is also preferable to provide a taper on a shoulder portion 120c as shown in FIG. 2 in order to reduce turbulent air flow produced around the Rondel-type field cores 120, that is to reduce wind noise during rotation of the rotor 100.

Fans 114, 115 are fixed to the Rondel-type field cores. Blades 114a, 115a are formed by cut-raising the fans 114, 115. The number, area, shape, etc. of the blades 114a, 115a are restricted to a certain extent due to the desirability of a small sized apparatus, the magnetic efficiency in the field cores, etc.

More specifically, the fans 114 and 115 are installed in the apparatus, together with the rotor 100, after being fixed to side surfaces of the rotor 100, thus allowing them to rotate together with the rotor during operation. Therefore, the external diameter of the fans 114 and 115 are restricted by the internal diameter of the stator 200, while the internal diameter of the fans 114, 115 are restricted by the diameter of bearing holders, etc. of the brackets 300, 400.

Furthermore, the height of each of the blades 114a, 115a formed by cut-raising the fans 114, 115 is restricted to a height that prevents contact with other incorporated members of the assembly.

The fans 114, 115 are respectively provided with ten blades 114a, 115a formed by cut-raising the fans toward the brackets 300. Of course, any suitable number of blades could be provided. The blades 114a, 115a are provided with substantially triangular protruding portions 114b, 115b formed in the direction of the field core 120 of the rotor 100.

The protruding portions 114b, 115b are formed by cut-raising in the opposite direction of the blades 114a, 115a (i.e., in the direction of the Rondel-type field core 120) at the same time as the blades 114a, 115a are cut-raised.

The blades 114a, 115a may be formed perpendicular or almost perpendicular to the axis of the rotor, because cooling air will be produced as long as they are not formed horizontally. However, considering the effective cooling area, the more perpendicular the blades are formed, the higher the cooling efficiency that is achieved. Thus, the blades 114a, 115a, including the protruding portions 114b, 115b, generate a cooling air flow during rotation of the rotor 100.

The protruding portions 114b, 115b are formed into a shape in line or substantially in line with the shoulder portion 120c of the Rondel-type field core 120. Accordingly, since the shoulder portion 120c is tapered to be substantially triangular in this embodiment, the protruding portions 114b, 115b are also formed triangular or substantially triangular.

As a result of the forming of protruding portions 114b, 115b, it may be said that effective area of the blades 114a, 115a of the fans 114, 115 becomes larger or increased by the area of the protruding portions 114b, 115b, resulting in improvement in cooling performance of the fans 114, 115. Furthermore, as the protruding portions 114b, 115b extending inward from the fans 114, 115 may increase air flow sent toward the stator core 210 and the stator winding 220, cooling of the stator core 210 and the stator winding 220, which both generate heat during the power generating operation, is greatly improved.

In such a cooling operation, the area of the blades 114a, 115a of the fans 114, 115 represent the effective cooling area, such that a larger effective area causes greater air flow rate. It is to be noted in this embodiment that since the blades 114a, 115a are formed almost perpendicular to the fans 114, 115, there is no large difference between the actual area of the blades 114a, 115a and their effective area.

The fans 114, 115 are formed from a metal plate sheet by the action of a press, wherein notches for forming the blades 114a, 115a are also formed at the time of press working. At the time of cut-raising the blades 114a, 115a, the protruding portions 114b, 115b are simultaneously cut-raised.

Accordingly, by varying the cutting line for the cut-raising operation, the shape of the protruding portions 114b, 115b may be changed. Thus, even if shape of the shoulder portion 120c of the Rondel-type field cores 120 is complicated, the shape of the protruding portions 114b, 115b may be easily adjusted.

This situation is the same for blades 114a and 115a. That is, the shape of the blades 114a, 115a may be easily varied in conformance with the internal shape of the brackets 300, 400.

With regard to the operation of the alternating current generator of the above construction, when the rotor 100 is rotated by an external driving force, a magnetic field generated by the field winding 130 surrounds the Rondel-type field cores 120, and the magnetic field passes through the stator winding 220 in conformance with the rotation of the rotor 100. In this manner, a current is generated in the stator winding 220 and a power is generated through a rectifier 500.

Furthermore, when the rotor 100 is rotated, the fans 114, 115 fixed to the side of the Rondel-type field cores 120 are rotated together, and the blades 114a, 125a and the protruding portions 114b, 115b, both cut-raised from the fans 114, 115, are also rotated to produce air flow inside the generator.

The air flows may be principally divided into flows (A) and (B) or flows (C) and (D). Flows (A) and (B) represent air flowing in through an inlet port 300a of the front bracket, passing through the coil end of the stator winding 220, and flowing out through an outlet port 310b of the front bracket.

Flows (C) and (D) represent air flowing in through an inlet port 400a of the rear bracket, passing through the rectifier 500 and brush 600, and flowing out through an outlet port 400b of the rear bracket. The inside of the generator is cooled by these air flows.

In the first embodiment, since the fans may be formed by only one press working step as described above, productivity is improved and cost reduction is achieved.

Furthermore, since the gap between the shoulder portion 120c and the blade 114a or 115a of the Rondel-type field cores 120 may be small, even if the blades 114a, 115a are deformed toward the external diameter of the rotary shaft 110 during revolution of the rotor 100, the deformation of the blades 114a, 115a may be minimized by the protruding portions 114b, 115b contacting the shoulder portion 120c.

A second embodiment of the invention relates to a mounting structure of the plates.

Figure 4:
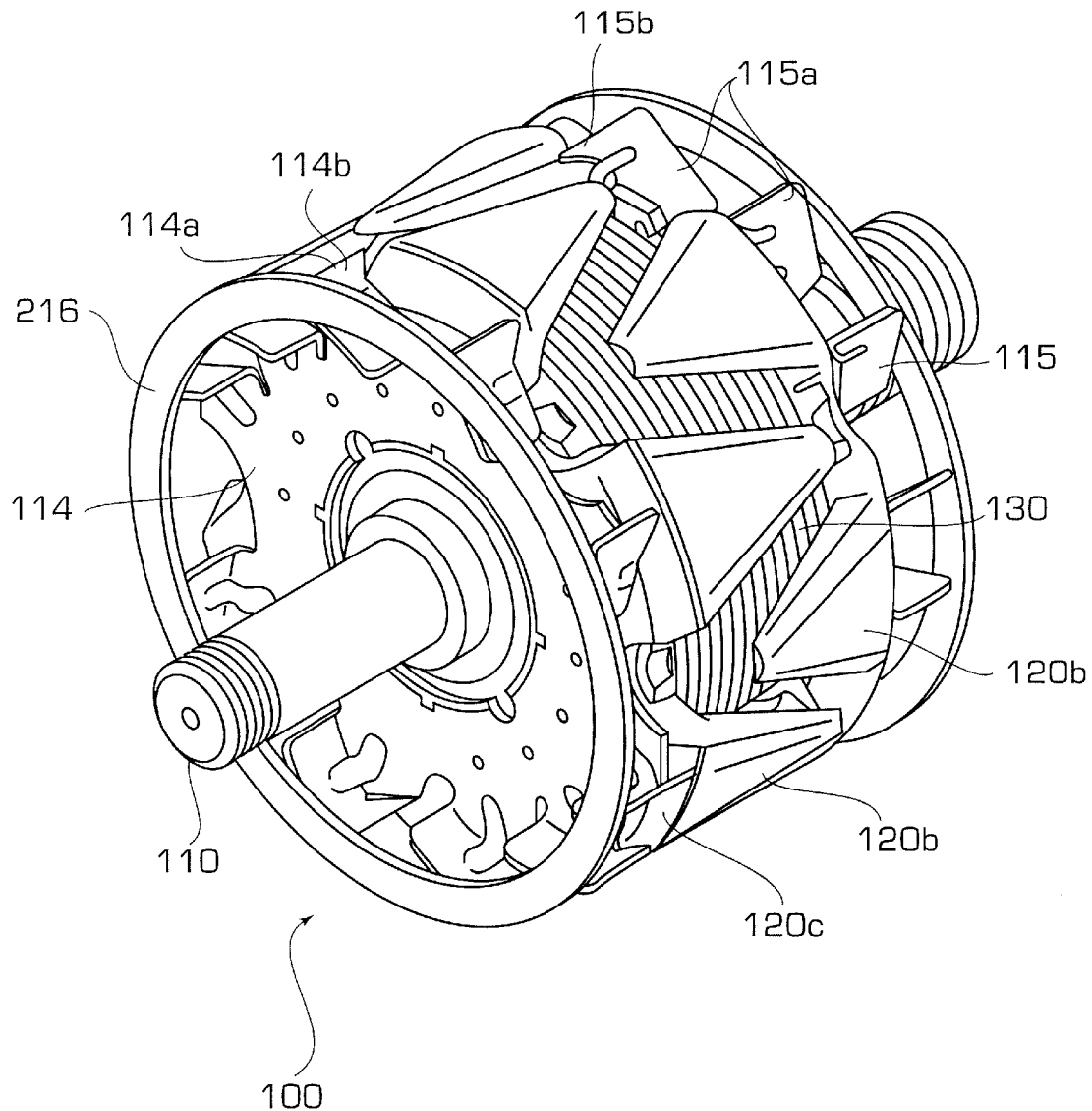
FIG. 4 is a perspective view showing a rotor in accordance with a second embodiment of the present invention.
Figure 5:
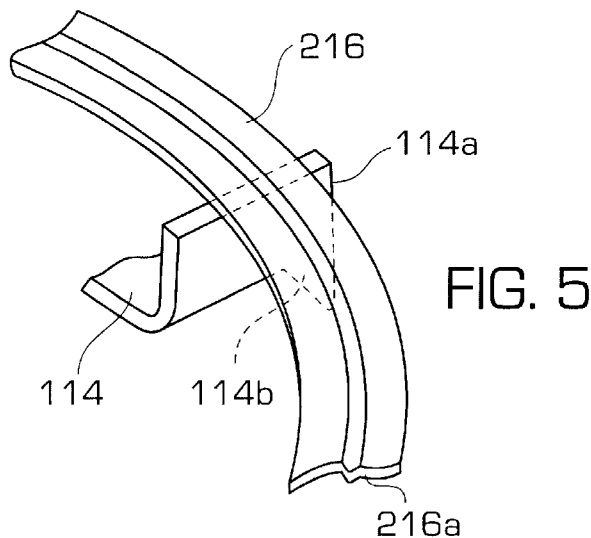
FIG. 5 is a partial perspective view showing a fan and a plate in accordance with the embodiment shown in FIG. 4.

FIG. 4 is a perspective view showing the second embodiment, while FIG. 5 is a partial perspective view showing a plate and a fan in the same embodiment. In the figures, like reference numerals designate the same parts as those found in the foregoing first embodiment, so that further description thereof is omitted below.

Annular metal plates 216, 217 are fixed to ends of the blades 114a, 115a, respectively, on the bracket sides by adhesion or welding.

The plates 216, 217 are formed into a shape capable of rectifying cooling air produced during revolution, together with the fans 114, 115. More specifically, passage of a cooling air flow is divided by the plates 216, 217, whereby turbulent air flow is diminished, thus in improvement in cooling efficiency and reduction in noise.

The passage of air flow divided by the plates 216, 217 and the blades 114a, 115a is directed to the stator 200, whereby the efficiency of cooling the stator core 210 and the stator winding 220 is improved as a result of mounting of the plates 216, 217.

Furthermore, as a result of mounting of the plates 216, 217, the blades 114a, 115a are fixed by both the Rondel-type field cores 120 and the plates 216, 217, which improves the structural strength of the blades, preventing the blades from being distorted during revolution, which eventually results in improvement in apparatus reliability.

In addition, the plate 216 shown in FIG. 5 is provided with a projection 216a at its center, this projection serving as a welded part for carrying out projection welding of the plate 216 to the blade 114, which is a type of resistance welding. Plate 217 has a similar projection.

The third embodiment of the invention relates to a positioning structure of the plates.

Figure 7:
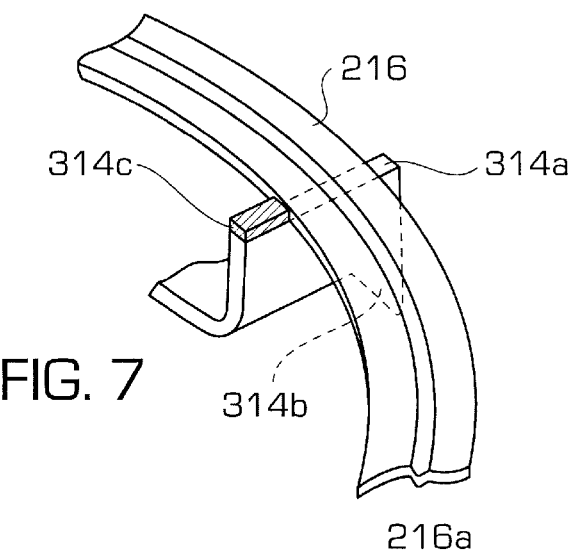
FIG. 7 is a partial perspective view showing a fan and a plate in accordance with the embodiment shown in FIG. 6.
Figure 6:
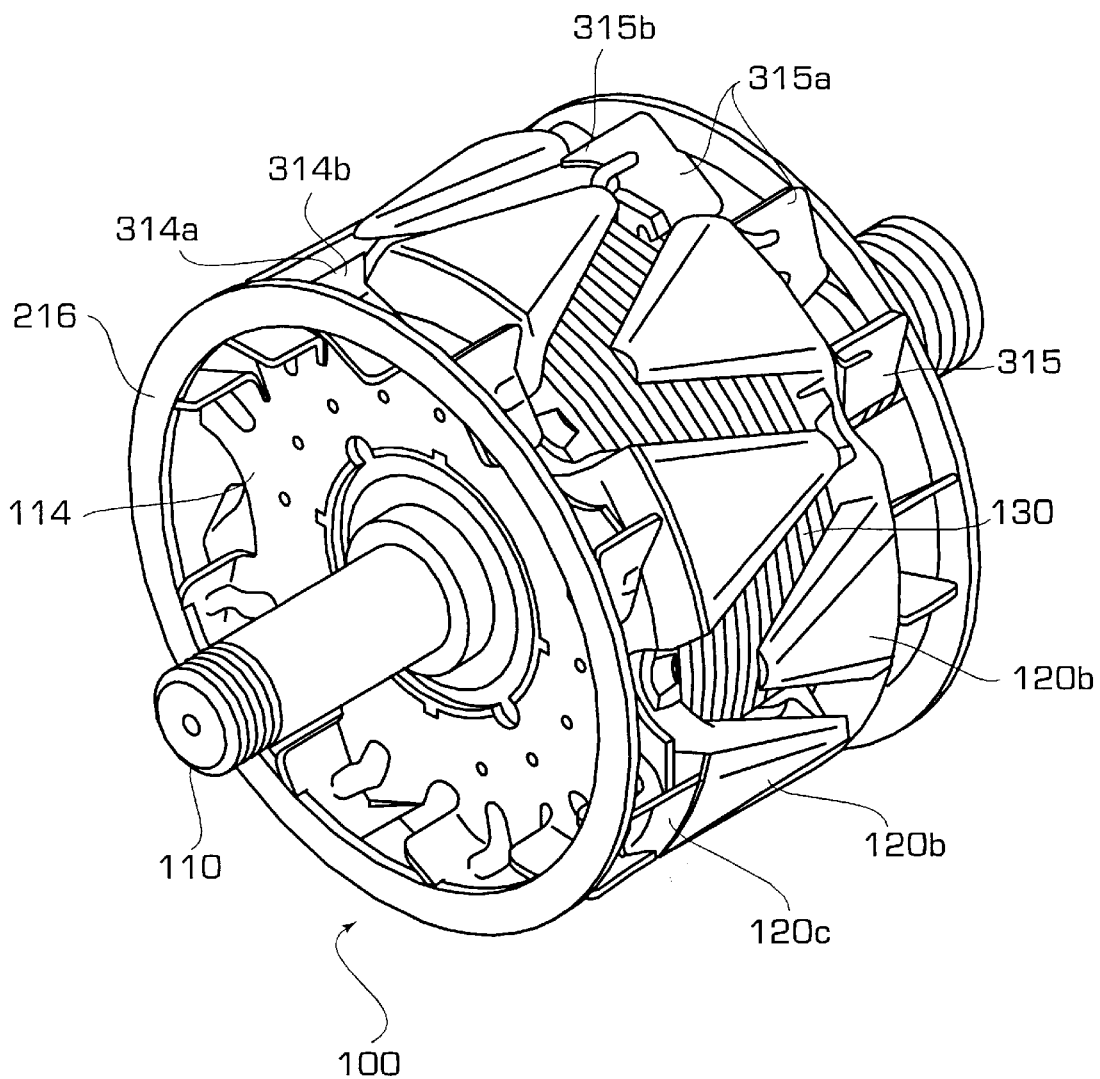
FIG. 6 is a perspective view showing a rotor in accordance with the third embodiment 3 of the present invention.

FIG. 6 is a perspective view showing the third embodiment, and FIG. 7 is a partial perspective view showing the blade 314a and the plate 216. In the figures, like reference numerals designate the same parts as those found in the foregoing embodiments, so that further description thereof is omitted below.

Reference numerals 314, 315 designate fans formed by press working which are fixed to the Rondel-type field cores 120.

The fans 314, 315 are respectively provided with ten blades 314a, 315a formed by cut-raising. Any suitable number of blades, however, could be provided. The blades 314a, 315a are respectively provided with triangular or almost triangular protruding portions 314b, 315b formed at the time of the cut-raising in the direction of the Rondel-type field cores 120.

The protruding portions 314b, 315b are formed into a shape in line or substantially in line with the shape of the shoulder portion 120c of Rondel-type field cores 120.

Rectangular projecting portions 314c, 315c projecting along the plates 216, 217 are respectively formed on the sides of the blades 314a, 315a to be in line with the shape of the plates 216, 217. The projecting portions 314c, 315c are useful for positioning at the time of fixing the plates 216, 217 to the fans 314 and 315, respectively.

The projecting portions 314c, 315c also contribute to increase the effective area of the blade 314a resulting in an increase in air flow rate.

A fourth embodiment of the invention also relates to a positioning structure of the plates.

Figure 8:
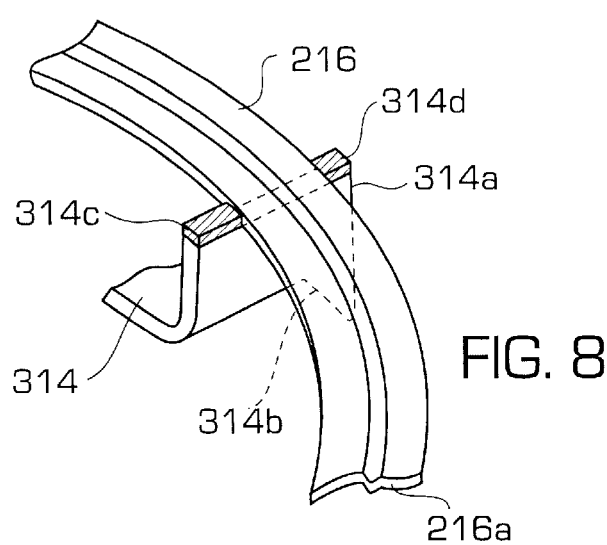
FIG. 8 is a partial perspective view showing a fan and a plate in accordance with the fourth embodiment of the present invention.

FIG. 8 is a partial perspective view showing the blade 314a and the plate 216 according to the fourth embodiment. In this figure, like reference numerals designate the same parts as those found in the foregoing embodiments, so that further description thereof is omitted below.

Reference numeral 314d designates a projecting portion formed on the plate side of the blade 314a. The plate 216 is positioned between the projecting portion 314c and the projecting portion 314d at its internal and external diameter sides, respectively, resulting in more exact positioning.

The projecting portions 314c, 314d also contribute to increase the effective area of the blade 314a, resulting in an increase of the air flow rate.

In the foregoing third and fourth embodiments, the positioning of the plates 216, 217 may be made easier by forming a part of the projecting potion 314c or the projecting portion 314d into a "]" shape. Furthermore, fixing of the plates 216, 217 also becomes more exact. The projecting portions 314c, 314d are disposed so as not to contact the bracket, etc. during rotation of the rotor 100.

Although the plates 216, 217 are metal plates in the foregoing second through fourth embodiments, plates of any other material such as resin are also satisfactory.

Although the plates 216, 217 are annular metal plates in the foregoing second through fourth embodiments, plates of any other shape such as a disk shape provided with a plurality of holes are also satisfactory.

Figure 14:
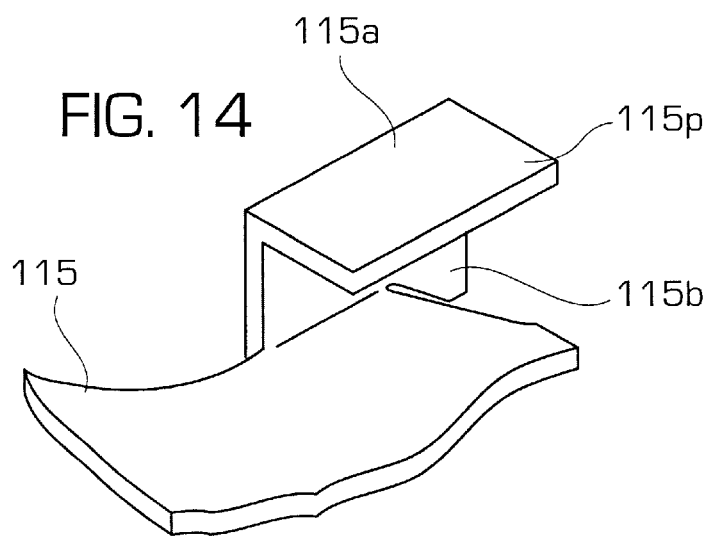
FIG. 14 is a partial perspective view showing a fan in accordance with a modification of the foregoing embodiments of the present invention.
Figure 17:
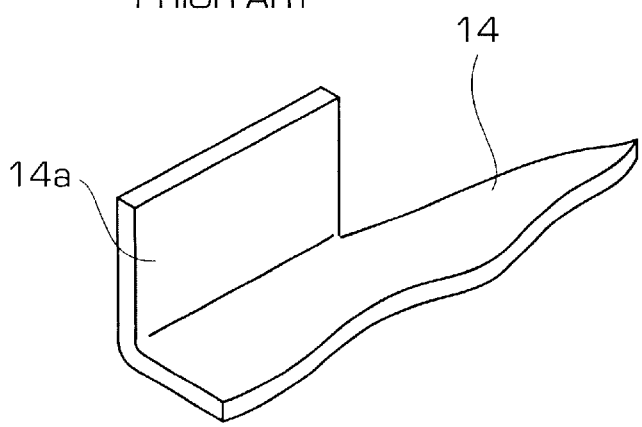
FIG. 17 is a partial perspective view showing a fan in the conventional alternating current generator shown in FIG. 15.

Although the plates 216, 217 are separate members from the fans 114, 115, it is also possible that, as shown in FIG. 14, the ends of the blade portions of the fans 114, 115 are further bent to form a plate portion 115p, whereby substantially the same rectification effect as that of the separate plate may be accomplished, resulting in substantially the same cooling effect.

In the foregoing first through fourth embodiments, it is also possible to fix the protruding portions 114b, 115b to the shoulder portion 120c.

Although the fans are formed of metal plates in the foregoing embodiments, fans may also be formed of any other material such as resin (by a molding process). In such a modification, the blade portions may be formed simultaneously at the time of molding.

Although the fans 114, 115 are formed from a sheet of metal plate by a press working operation in the foregoing embodiments it is also possible to separate them into plural parts that are separately formed and fixed to the field cores 120.

The fifth embodiment of the present invention relates to a rotatable blade structure.

Figure 9:
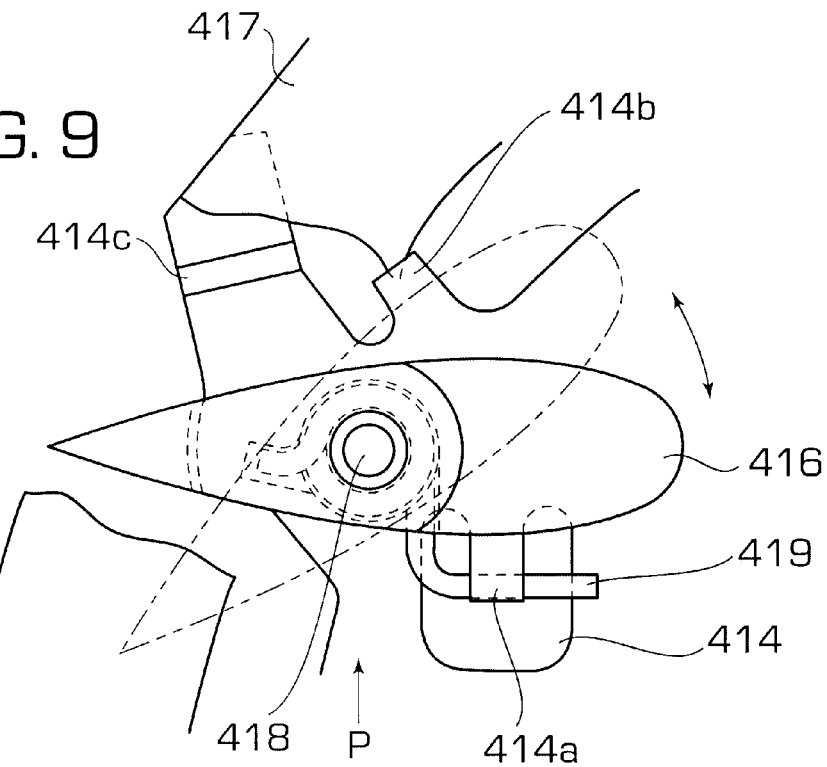
FIG. 9 is a partial plan view showing a fan and a plate in accordance with a fifth embodiment of the present invention.
Figure 10:
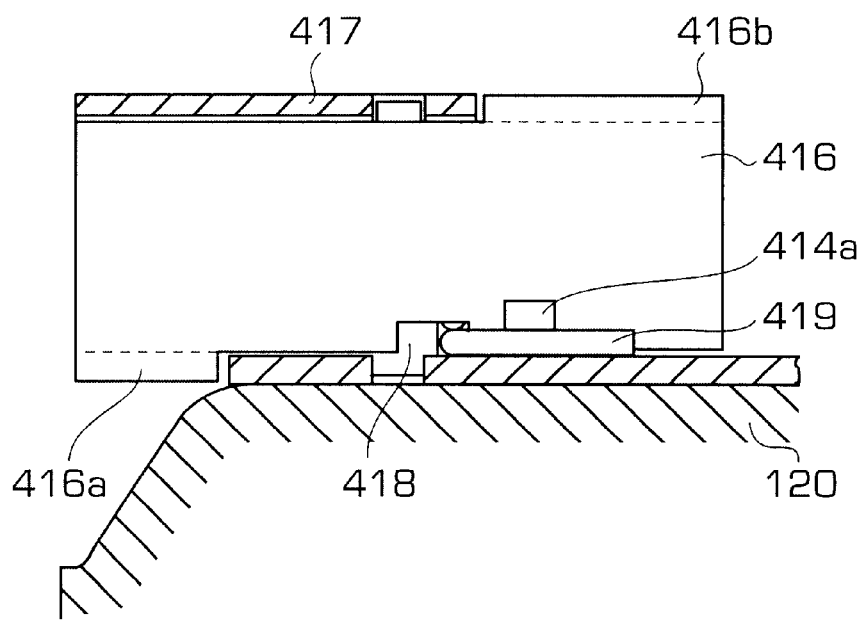
FIG. 10 is a partial sectional view showing a fan, a plate and a field core during revolution at a low speed in accordance with the embodiment shown in FIG. 9.
Figure 11:
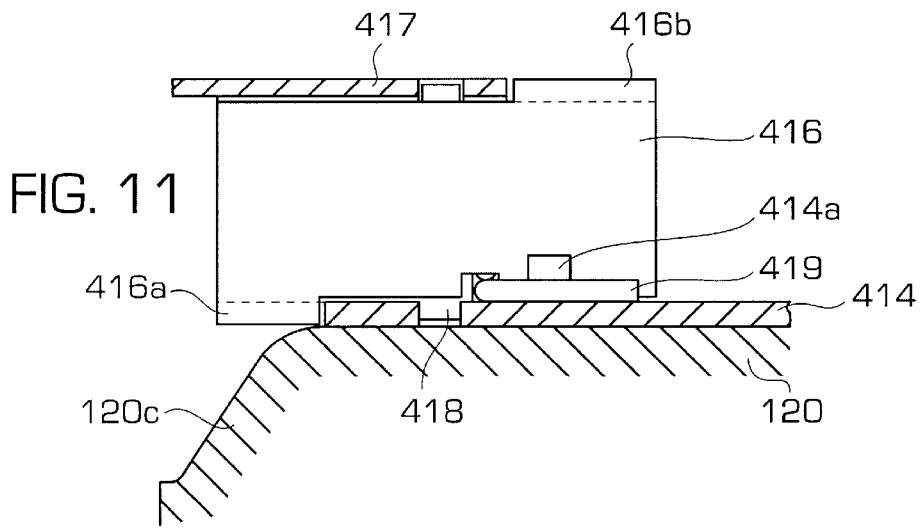
FIG. 11 is a partial sectional view showing a fan, a plate and a field core during revolution at a high speed in accordance with the embodiment shown in FIG. 9.

FIG. 9 is a partial plan view showing the fifth embodiment. FIG. 10 is a sectional view showing a state before the revolution of moving blade 416. FIG. 11 is a sectional view showing a state after the revolution of the moving blade 416. In the figures, like reference numerals designate the same parts as those found in the foregoing embodiments, so that further description thereof is omitted below.

A main plate 414 of a fan is fixed to the Rondel-type field core. A moving blade 416 of resin or the like is formed separately from the main plate 414. A plate 417 is similar to the plates 216, 217 shown in the second embodiment. A support 418 is vertically erected, whose ends are fixed to the main plate 414 and to the plate 417, serving as a center shaft during revolution of the moving blade 416.

A coil spring 419 is stored in the blade 416 whose end is fixed to the blade 416 and whose other end is fixed to a spring stopper of the main plate 414. The blade 416 is held at its position by an urging force of the coil spring so long as the rotor is rotated at a low speed.

If the rotor is rotated at a high speed, the blade 416 is caused to turn around the support 418, due to an angular moment produced by a centrifugal force which becomes larger than the urging force of a coil spring 419, causing contact with the stopper 414b of the main plate 414, whereby the turning of the blade 416 is stopped and held at that position.

As shown in FIGS. 10 and 11, the blade 416 is enlarged toward the upper face of the plate 417 (i.e., an enlarged part 416b serving as a projecting portion in FIGS. 10 and 11) and also to the field core side (i.e., an enlarged part 416a serving as a protruding portion in FIGS. 10 and 11).

The operation of the moving blade is described below.

Generally, the output of the alternating current generator is saturated at a predetermined rpm, while a cooling air flow rate produced by a cooling fan is increased in proportion to the rpm, while the wind noise is also increased.

In this regard, the temperature rise value of every part inside the generator cooled by the cooling fan is dependent upon a relation between the output and air flow rate. For example, in a generator whose revolving speed at saturation output is 5000 rpm or so, the maximum point is in the range of 2000 to 3000 rpm, and the temperature rise value is sufficiently small due to sufficient cooling air flow rate during revolution at a high speed not lower than approximately 5000 rpm.

To reduce wind noise, which is a problem during revolution at a high speed, the moving blades are turned to restrain the air flow rate, whereby not only the temperature rise value is kept within an allowable level in every part but also the wind noise may be reduced.

It is to be noted that there is no variation in the air flow rate of the fans provided with the fixed blades as shown in the foregoing first embodiment, but that in the fans provided with moving blades as shown in the fifth embodiment, the moving blade 416 turns around the support 418 due to the centrifugal force acting on the center of gravity during revolution at a high speed, whereby the blade angle and external diameter of the moving blade vary, resulting in securing an appropriate and sufficient air flow rate.

Accordingly, when a sufficient cooling air flow rate is secured for revolution at a low speed or when the cooling air flow rate is excessively large for revolution at a high speed, the air flow rate may be restrained to reduce wind noise.

In addition, in the fifth embodiment, the blade 416 is formed to be enlarged, in order to be in line or almost in line with the side surface of the field cores during revolution at a high speed and to prevent the enlarged part 416a of the blade 416 from contacting the shoulder part of the field cores. Consequently, the blade area is increased resulting in improvement in cooling efficiency, particularly during revolution at a low speed when a larger air flow rate is required.

A sixth embodiment relates to a rotatable blade structure.

Figure 12:
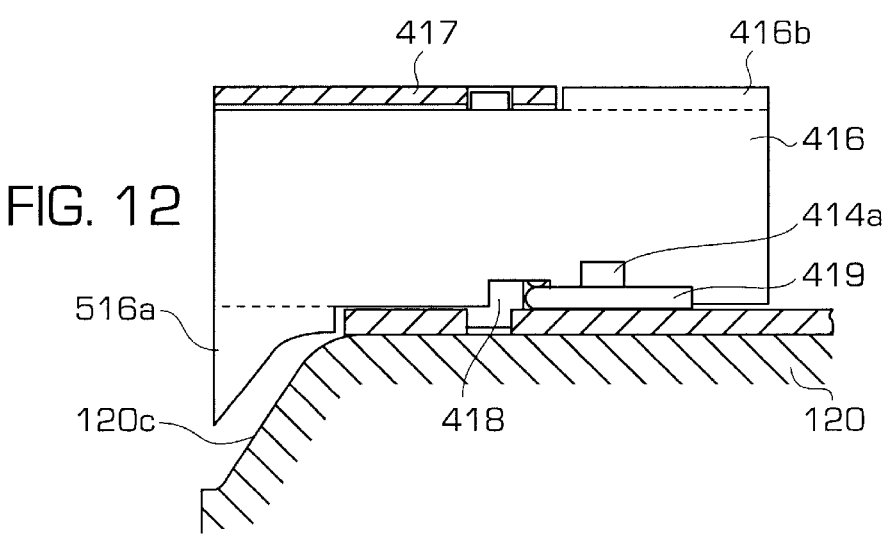
FIG. 12 is a partial sectional view showing a fan, a plate and a field core during revolution at a low speed in accordance with a sixth embodiment of the present invention.
Figure 13:
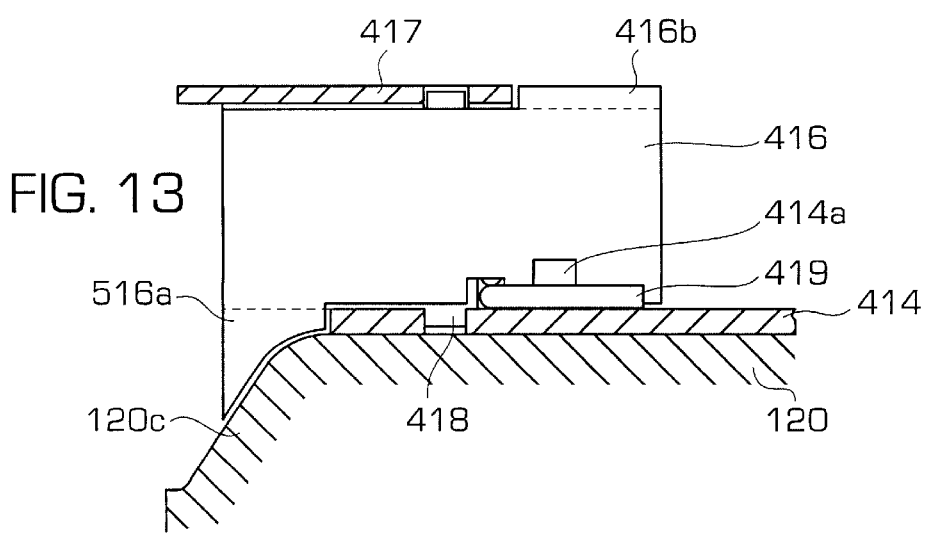
FIG. 13 is a partial sectional view showing a fan, a plate and a field core during revolution at a high speed in accordance with the embodiment shown in FIG. 12.
Figure 15:
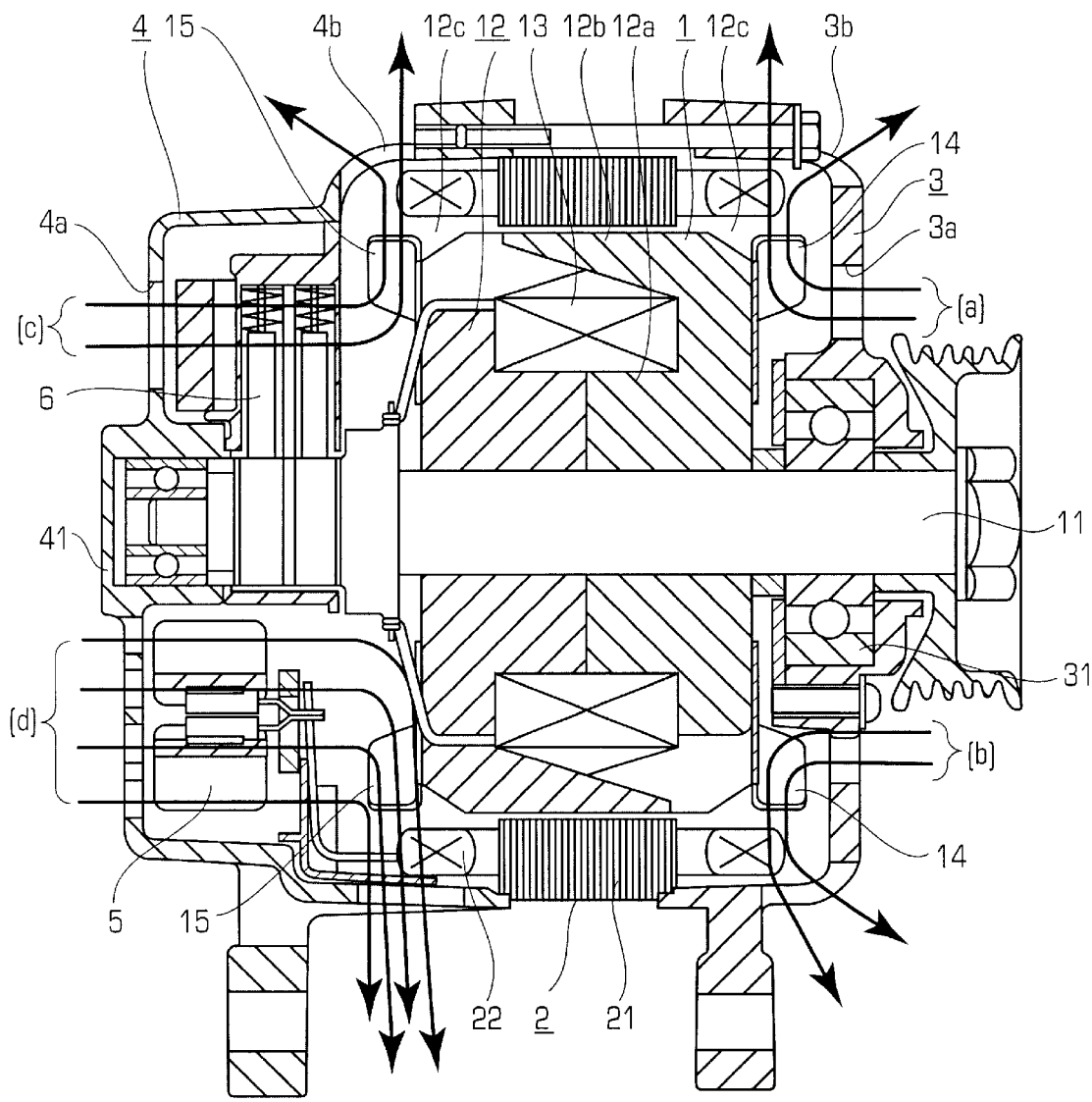
FIG. 15 is a sectional view showing a conventional alternating current generator for a car.
Figure 16:
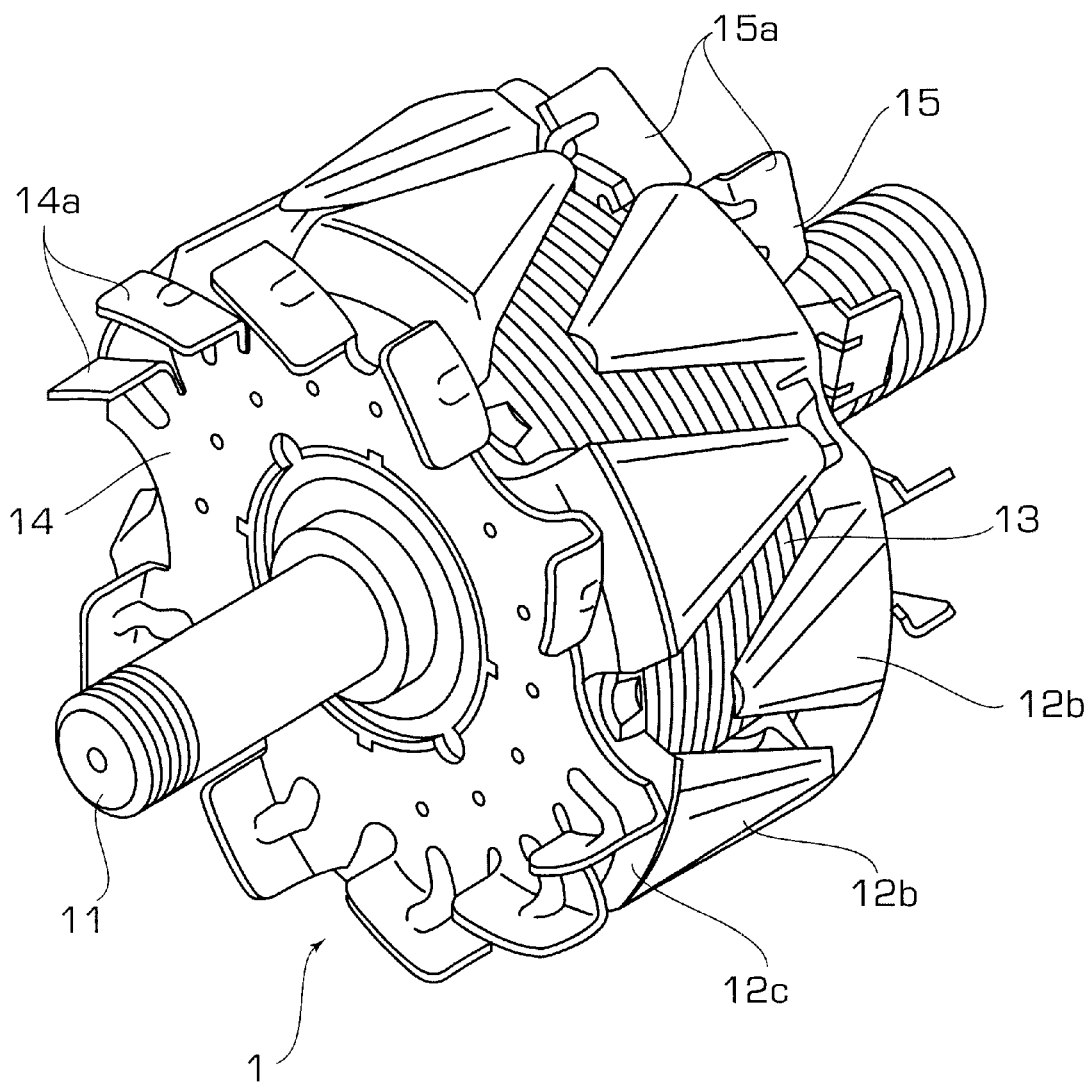
FIG. 16 is a perspective view showing a rotor in the conventional alternating current generator shown in FIG. 15.

FIGS. 12 and 13 are sectional views both showing the sixth embodiment, where FIG. 12 shows revolution at a low speed and FIG. 13 shows revolution at a high speed. In the figures, like reference numerals designate the same parts as those found in the foregoing embodiments, so that further description thereof is omitted below.

Reference numeral 516a designates an enlarged portion, which is enlarged from the moving blade 416 to the field core 120 side. The enlarged portion 516 is formed into a shape in line or substantially in line with the shape of the shoulder portion 120c of the field cores 120, and in this embodiment, the enlarged portion 516 comes closest to the shoulder portion 120c during revolution at a high speed as shown in FIG. 13, whereby a gap formed in line with the shape of the shoulder portion 120c between the enlarged portion 516 and the shoulder portion 120c is minimized. On the other hand, during revolution at a low speed shown in FIG. 12, the enlarged portion 516 is separate from the shoulder portion 120c, and a larger gap is formed therebetween.

Although the stopper 414b is formed on the main plate of the fan in the foregoing fifth and sixth embodiments, it is also preferable that the enlarged portions 416a, 516a of the moving blade 416 come in contact with the shoulder portion 120c of the field core instead of forming the stopper.

Although the projecting portions of the blade formed into a shape in line or substantially in line with the shoulder portion of the Rondel-type field core are shown in the foregoing embodiments, it is also preferable to form the projecting portions along the stator or the front and rear brackets.

Although the invention is described with respect to the alternating current generator for a car provided with Rondel-type field cores, any other alternating current generator is satisfactory as as the generator is provided with a rotor. For example, the fans are applicable to an alternating current generator for a car provided with star-shaped field cores.

Although the invention is described with respect to the alternating current generator for a car in the foregoing embodiments, it is also possible to apply the invention to any other alternating current generators. However, considering the requirements of installation in a quite limited space or the need of a certain cooling performance under a high ambient temperature, the invention is particularly advantageous in an alternating current generator for a car or any other alternating current generator put in use under similar conditions.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An alternating current generator comprising:
    a rotor having a rotor core, a rotary shaft, and a field winding which rotates by transmission of a driving force applied thereto;
    a bracket for rotatably supporting said rotor;
    a stator fixed to said bracket and having a stationary core and a stationary winding;
    a fan fixed to said rotor, having a plurality of blades extending towards said bracket and a protrusion formed on each of said blades extending towards and over a portion of said rotor core;
    wherein said blades are pivotally attached to said fan to pivot in relation to rotation of said fan, the pivotal motion of each of said blades being about a respective axis different from an axis of rotation of said rotary shaft and parallel to the axis of said rotary shaft.

2. An alternating current generator comprising:
    a rotor, having a rotor core, a rotary shaft and a field winding, which rotates by transmission of a driving force applied thereto;
    a bracket for rotatably supporting said rotor;
    a stator fixed to said bracket and having a stationary core and a stationary winding;
    a fan fixed to said rotor;
    a plurality of blades rotatably supported on said fan so that each of said blades may rotate about a respective axis different from a rotational axis of said rotor shaft, and
    a plurality of protrusions, each formed on a respective one of said blades and extending toward and over a portion of said rotor core;
    wherein rotation of one blade of said plurality of blades creates a gap between said rotor and an enlarged portion of said blade, said gap increasing in size when a revolution speed of said generator increases.

3. An alternating current generator comprising:
    a rotor having a rotor core, a rotary shaft, and a field winding which rotates by transmission of a driving force applied thereto;
    a bracket for rotatably supporting said rotor;
    a stator fixed to said bracket and having a stationary core and a stationary winding;
    a fan fixed to said rotor;
    a plurality of blades rotatably supported on said fan so that each of said blades may rotate about a respective axis different from a rotational axis of said rotor shaft, and
    a plurality of protrusions, each formed on a respective one of said blades and extending towards and over a portion of said rotor core; and
    wherein said respective axis of rotation of each blade is located in a position between distal ends of the corresponding blade so that said distal ends of the corresponding blade are rotatable about said respective axis of rotation of the blade.

* * * * *